US012699354B2

(12) United States Patent
Christan

(10) Patent No.: US 12,699,354 B2
(45) Date of Patent: Aug. 4, 2026

(54) STOP PAWL FOR HOROLOGICAL MOVEMENT

(71) Applicant: ETA SA Manufacture Horlogère Suisse, Grenchen (CH)

(72) Inventor: Julien Christan, Bienne (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 447 days.

(21) Appl. No.: 18/351,467

(22) Filed: Jul. 12, 2023

(65) Prior Publication Data

US 2023/0375979 A1 Nov. 23, 2023

Related U.S. Application Data

(62) Division of application No. 17/192,956, filed on Mar. 5, 2021, now Pat. No. 11,789,406.

(30) Foreign Application Priority Data

Mar. 31, 2020 (EP) .................................... 20167288

(51) Int. Cl.
*G04B 11/02* (2006.01)

(52) U.S. Cl.
CPC .................................. *G04B 11/022* (2013.01)

(58) Field of Classification Search
CPC ..... G04B 11/04; G04B 11/022; G04B 11/028; G04B 11/026; G04B 11/003
See application file for complete search history.

(56) References Cited

U.S. PATENT DOCUMENTS 835,710 A * 11/1906 Ohlson .................... G04B 1/20 968/75
940,117 A 11/1909 Aune
(Continued)

FOREIGN PATENT DOCUMENTS

CH 41 448 A 11/1908
CH 711 851 A1 6/2017
(Continued)

OTHER PUBLICATIONS

Combined Chinese Office Action and Search Report issued Nov. 24, 2023, in corresponding Chinese Patent Application No. 202211145554.1 (with English Translation of Category of Cited Documents), 6 pages.

(Continued)

*Primary Examiner* — Renee S Luebke
*Assistant Examiner* — Matthew Daniel Hwang
(74) *Attorney, Agent, or Firm* — Oblon, McClelland, Maier & Neustadt, L.L.P.

(57) ABSTRACT

A stop pawl for a horological movement, including a body provided on the periphery with a lug for latching with the toothing of a ratchet; a hub intended to cooperate freely in rotation with a fixed rod according to an angular displacement between an active position meshing the lug with the toothing of the ratchet and an inactive position, via intermediate positions; wherein the pawl includes at least one device for returning the pawl during its angular displacement, from the inactive position to the active position; and wherein the return device and the body are made in one piece. A horological movement and timepiece can include such a pawl.

13 Claims, 4 Drawing Sheets

(56) References Cited

U.S. PATENT DOCUMENTS

| | | | |
|---|---|---|---|
| 971,500 | A | 9/1910 | Groff |
| 3,844,108 | A | 10/1974 | Bachmann |
| 2016/0274545 | A1 | 9/2016 | Humair |
| 2019/0163134 | A1 | 5/2019 | Peter |
| 2021/0109483 | A1 | 4/2021 | Jeanneret |

FOREIGN PATENT DOCUMENTS

| | | | |
|---|---|---|---|
| CN | 108427260 | A | 8/2018 |
| CN | 110083044 | A | 8/2019 |
| GB | 1 543 306 | | 4/1979 |
| JP | 53-90968 | A | 8/1978 |
| JP | 4927467 | B2 | 5/2012 |
| JP | 2017-96925 | A | 6/2017 |

OTHER PUBLICATIONS

Korean Office Action issued in Korean Patent Application No. 10-2021-0038336 on Feb. 24, 2023 (w/ English Translation).

Japanese Office Action issued in Japanese Patent Application No. 2021-044278 on Mar. 8, 2022 (w/ English Translation).

Combined Chinese Office Action and Search Report issued in Chinese Patent Application No. 202110347351.X on Mar. 21, 2022 (w/ English Translation of Category of Cited Documents).

European Search Report issued in European Application 20167288.8 on Oct. 6, 2020 (w/ English Translation of Categories of Cited Documents).

* cited by examiner

STOP PAWL FOR HOROLOGICAL MOVEMENT

CROSS-REFERENCE TO RELATED APPLICATION

This application is a division of U.S. patent application Ser. No. 17/192,956 filed Mar. 5, 2021, which claims priority to European Patent Application No. 20167288.8 filed Mar. 31, 2020, the entire contents of each of which are incorporated herein by reference.

FIELD OF THE INVENTION

The invention relates to a stop pawl for a horological movement.

The invention also relates to a horological movement including at least one such stop pawl.

The invention also relates to a timepiece including at least one such horological movement.

The invention relates to the field of watchmaking, and more particularly to the field of stop pawls for controlling the transmission of a movement, a striking-work, or else another functionality of a timepiece.

BACKGROUND OF THE INVENTION

In the conventional architecture of a horological movement, a latch comprises a ratchet driven in an angular movement by a barrel. This ratchet in the shape of a toothed wheel cooperates with a stop pawl. This stop pawl is mounted movable in rotation and is provided on the periphery with a lug. This lug cooperates by meshing with the toothing of the ratchet, so as to allow rotation of said ratchet only in one direction. Indeed, the mobility of the pawl ensures its rotation according to an angular displacement from an active position, meshing said lug with the toothing of said ratchet to an inactive position, wherein the lug is retracted and the ratchet can rotate freely.

The return from the inactive position to the active position as well as keeping the pawl meshed with the ratchet are performed by means of a return means. In short, the return means returns the pawl to the active position to block the rotary movement of the ratchet. Thus the displacement of said pawl ensures a certain return angle which allows to prevent the balance from harping, also preventing the barrel from emptying.

The return means is in the shape of an independent spring, such as a bent wire or an elastic blade, one end of which is fixed in the blank, while the opposite end is attached to the pawl.

Apart from the addition of an independent part, the return performed by a spring complicates mounting and dismounting such a horological movement. Indeed, during mounting, it is necessary to place the spring by stressing it, in particular by fixing one of its ends on the blank and the opposite end on the pawl, while correctly positioning said pawl by meshing with the toothing of the ratchet already in place.

As such, the pawl is mounted on a blank within a housing. This mounting is carried out by means of a rod ensuring the fixing of said pawl on the blank. The rod cooperates internally with a hub formed within the pawl, so as to create a pivot connection, allowing free rotation of the pawl relative to the rod. Such a rod is in the shape of a screw, screwed into a complementary tapping formed within said housing. This type of mounting therefore allows to dismantle the pawl by unscrewing the rod, before emptying the barrel, said pawl still being able to be stressed by the tension of the spring but especially by the tension of the barrel, which is strongly discouraged to avoid any deterioration of a component, or even sudden expulsion of the pawl.

SUMMARY OF THE INVENTION

The invention aims at simplifying a horological movement, by reducing the number of components and by simplifying the mounting and dismounting operations.

To this end, the invention contemplates a stop pawl incorporating the return means necessary to keep it meshed with the ratchet, so as to form a latch.

For this purpose, the invention relates to a stop pawl for a horological movement, comprising a body provided with at least:

- on the periphery, a lug for latching with the toothing of a ratchet;
- a hub intended to cooperate freely in rotation with a fixed rod according to an angular displacement between an active position meshing said lug with the toothing of said ratchet and an inactive position, via intermediate positions;

characterised in that said stop pawl comprises at least:

- one means for returning said stop pawl, during its angular displacement, from the inactive position to the active position;

and in that said return means and said body are made in one piece.

According to additional, non-limiting features, said return means may comprise at least one elastic blade with one end integral with said body and a free opposite end.

Said body may comprise, protruding at the periphery and located facing the opposite end, a hooking means in abutment with said opposite end.

Said body may comprise a groove extending between an inner face of said elastic blade and said body from the end integral with said body and to the free end of said elastic blade;

- the free end of said elastic blade comprising an overhang protruding on the inner face.

Said groove may comprise, facing the overhang, a cavity for receiving said overhang.

Said hub can be closed and is in the shape of a circular bore.

Said hub may be open, said body having an overall U-shape.

Said body is made of a metallic material.

Said body is made of a nickel-phosphorus alloy.

Said body is manufactured by a LIGA-type method.

Such a configuration of the pawl incorporating the return allows to reduce its space requirement, with a simplified manufacture of such a timepiece.

Furthermore, the design of the pawl, in particular of the return, allows such parts to be separated when they are packed in bulk, preventing them from clustering.

The invention also contemplates a specific mounting of such a pawl relative to the blank allowing to simplify this operation, dispensing with the tensioning of an independent spring. The pawl being rotationally free, the meshing positioning of the ratchet is considerably simplified.

In a related manner, the pawl can be mounted beforehand with said ratchet, and conversely for dismounting. In particular, when the pawl has an overall U-shape with an open hub, said pawl can be slid under the rod before positioning the ratchet. It is only the subsequent positioning of the ratchet that allows to keep the pawl in place. Consequently, once the ratchet is mounted, the pawl can no longer come out, which constitutes a safety for the dismounting of the horological movement. Indeed, it is then necessary to remove the ratchet first and to empty the barrel beforehand. Consequently, such a mounting allows to further simplify the configuration, by dispensing with a rod in the shape of a fixing screw and the precise step of tapping the blank.

To this end, the invention also relates to a horological movement comprising:

- a supporting structure in the shape of a blank;
- a ratchet mounted on said blank in a rotary movement, said ratchet being provided with toothing;
- a mechanism for latching with the toothing of said ratchet, said latching mechanism being rotatably mounted inside a housing formed within said blank;
- a rod for free rotation of said latching mechanism within the housing of said blank, said rod fixedly cooperating with a bore formed within the housing of said blank; characterised in that said latching mechanism comprises a stop pawl according to the invention.

According to additional, non-limiting features, the rod may comprise a head, ensuring the upper retention of the pawl along said rod.

Said bore can be tapped; said rod is in the shape of a screw.

Said rod may be in the shape of a nail driven into said bore.

Said housing comprises an inner wall cooperating with an outer face of the elastic blade of said pawl.

Consequently, the particular configuration of a pawl incorporating the return means and its mounting within the horological movement allow to control the return action at a range of its angular displacement. Indeed, according to a first range, the pawl is rotationally free and although the lug is meshing with the toothing, it does not apply any force to the ratchet, reducing the wear of the toothing over time. It is only over a second range of its angular displacement that the return is activated when said return means is compressed. Along this displacement including these two ranges, the friction between the pawl and the ratchet is therefore drastically reduced.

Furthermore, depending on the shape of the housing in the blank, it is possible to vary the ranges of the angular displacement of said pawl, to control the action of its return to bring the pawl back to the locking position of said ratchet as soon as possible. This early return allows in particular to limit the emptying of the barrel during an automatic winding.

Moreover, such a horological movement dispenses with the fixing of an independent spring, in particular with a precise step of tapping in the blank.

The invention also relates to a timepiece equipped with such a horological movement, such as a watch.

BRIEF DESCRIPTION OF THE FIGURES

The invention will be described in more detail below using the appended drawings, given by way of non-limiting examples, wherein.

DETAILED DESCRIPTION OF THE INVENTION

Figure 1:
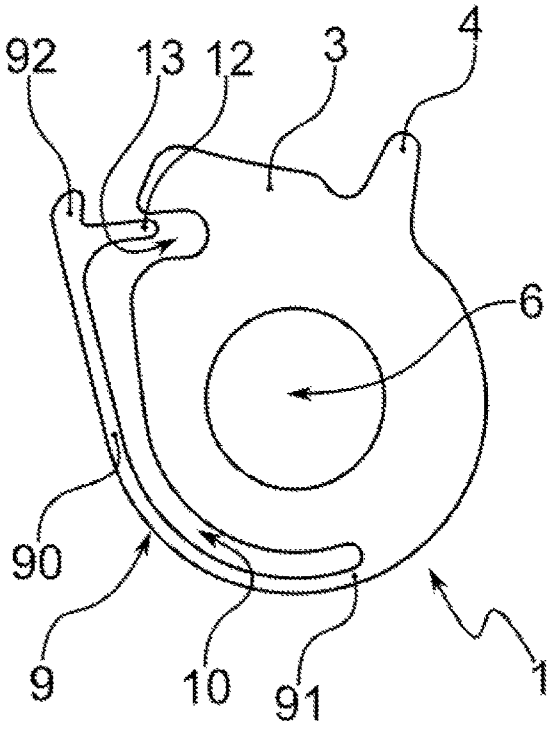
FIG. 1 schematically shows an elevational view of a first embodiment of a stop pawl, showing in particular a closed circular hub.

The present invention relates to the field of watchmaking, and more particularly to the field of stop pawls 1 for controlling the transmission of a horological movement 2, a striking-work, or else another functionality of a timepiece.

First of all, the invention aims at a stop pawl 1, hereinafter referred to as “pawl”, for a horological movement 2.

Such a pawl 1 comprises a body 3. This body 3 forms the entire part of the pawl 1. The body 3 of the pawl 1 therefore forms a single timepiece. The body 3 has an overall flattened shape. In revolution around a centre of rotation, the body 3 comprises a polygonal circumference with preferentially rounded peripheral edges. The peripheral edges extend orthogonally or essentially orthogonally relative to the upper and lower faces provided parallel to each other.

The body 3 of said pawl 1 is provided with at least several elements. These elements therefore consist of one or more portions of said body 3.

First of all, the body 3 comprises on the periphery, a lug 4. This lug 4 protrudes from the periphery, namely that the lug 4 projects outwards. The lug 4 extending radially or essentially radially, its median axis passing through the centre of rotation of the body 3.

Figure 5:
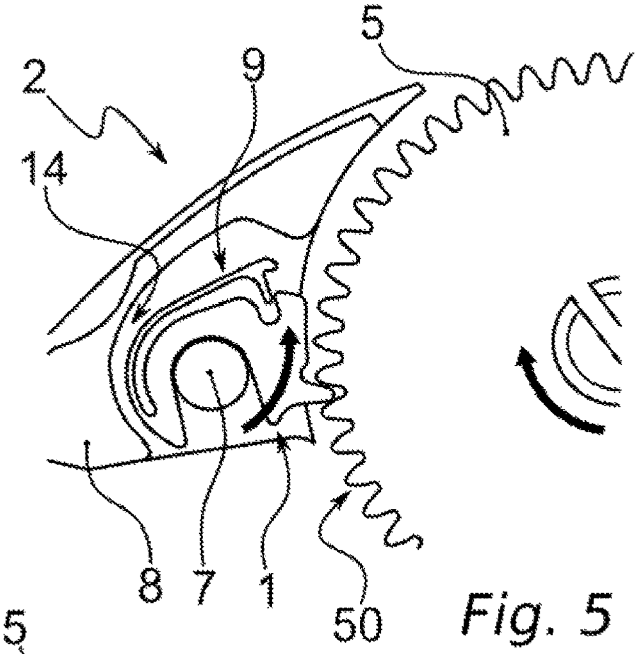
FIG. 5 schematically shows an elevational view of a first configuration of a horological movement, equipped with the first embodiment of the pawl, in an active position meshing with the toothing of a ratchet, showing in particular a closed housing.

The lug 4 is used as a latch with the toothing 50 of a ratchet 5. Consequently, the lug 4 is shaped and dimensioned to complement said toothing 50, so as to cooperate by at least partial meshing with the latter, as in particular visible in FIGS. 5 and 6.

Moreover, the body 3 comprises a hub 6. This hub 6 is intended to cooperate freely in rotation with a fixed rod 7.

The hub 6 is centred or essentially centred on the centre of rotation of the body 3. The hub 6 is made in the shape of a through hole from one to the other of the upper and lower faces of said body 3.

Figure 3:
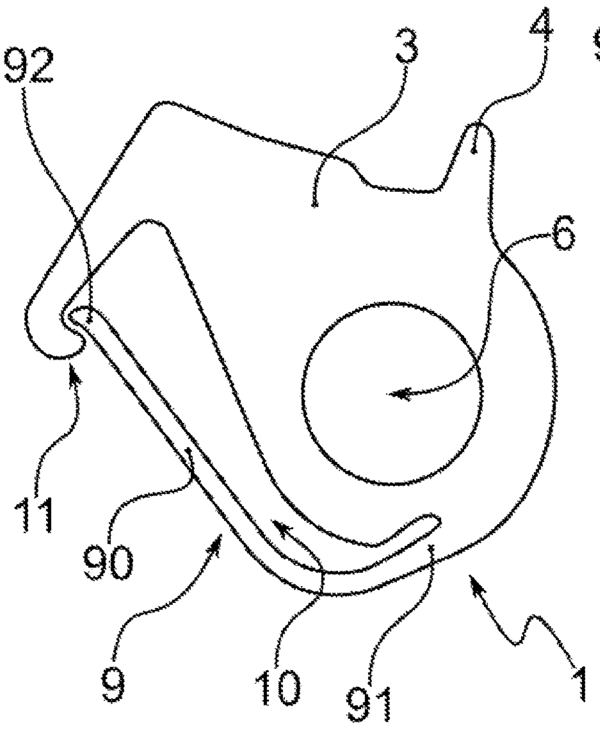
FIG. 3 schematically shows an elevational view of a second embodiment, showing in particular a closed circular hub.

According to one embodiment, said hub 6 is closed and is in the shape of a circular bore. The body 3 then has the overall shape of a drilled disc, like a washer. Such a round hub 6 is in particular visible in FIGS. 1 and 3.

According to a variant embodiment, said hub 6 is open, said body having an overall U-shape. The body 3 then has an overall horseshoe shape. The opening of the hub 6 is dimensioned to allow the passage of the rod 7, except for a clearance in order to allow the rotation of one relative to the other, once said rod 7 is correctly positioned at the centre of said hub 6.

Figure 2:
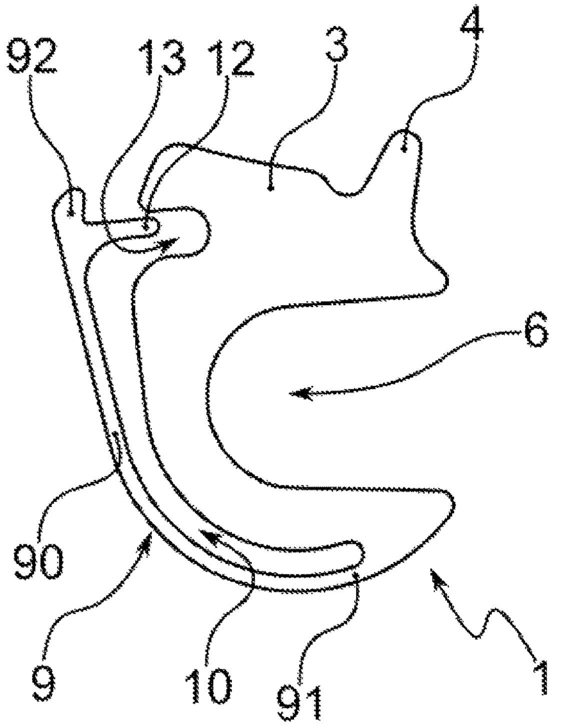
FIG. 2 schematically shows an elevational view of a variant of the first embodiment of the pawl, showing in particular an open hub providing an overall U-shape to said pawl.
Figure 4:
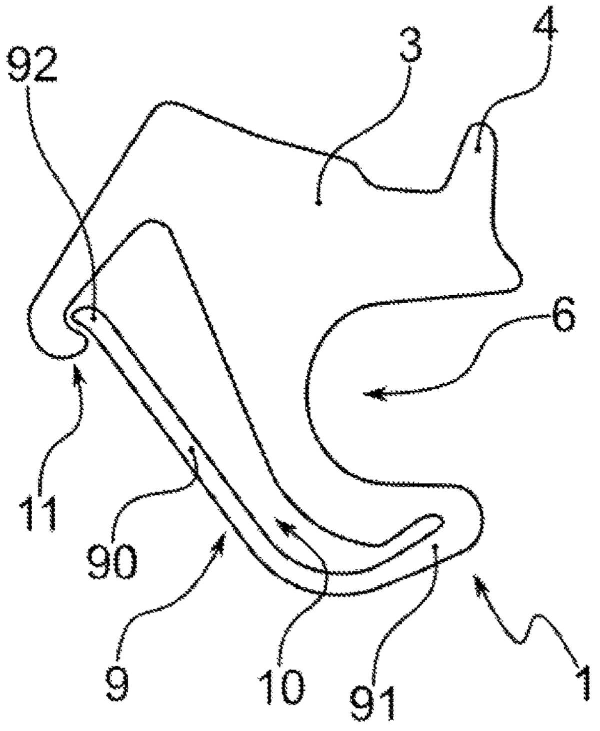
FIG. 4 schematically shows an elevational view of a variant of the second embodiment, showing in particular an open hub.

Moreover, the hub 6 has an inner wall orthogonal to said upper and lower faces. This inner wall has a circular portion, corresponding to the periphery of a circle centred on the axis of rotation of said body 3. Such an open hub 6 is in particular visible in FIGS. 2 and 4.

Furthermore, the rod 7 is an insert, forming part of the horological movement 2. The rod 7 ensures fixing and retaining the body 3 relative to a support, such as a blank 8 which may preferably be a barrel bridge. The inner face of the hub 6 then contacts the outer face of the rod 7, forming a pivot connection. Such a contact can be direct and provided to slide in rotation, or else indirect via a rotating ring equipping said rod 7.

The rotation of the hub 6 is performed according to an angular displacement between an active position meshing said lug 4 with the toothing 50 of said ratchet 5 and an inactive position, via intermediate positions. In particular, in the active position, the mechanical assembly of the lug 4 with the toothing 50 blocks the rotary movement of the ratchet 5, while in the inactive position, the lug 4 is retracted, leaving free the rotary movement of the ratchet 5.

Under the action of the ratchet 5, the lug 4 rotates the pawl 1 from the active position according to a first angular displacement portion, maintaining at least partial engagement with the toothing 50, until reaching an inactive position, wherein the lug 4 is no longer in contact with the toothing 50, then releasing the ratchet 5. The return of the pawl 1 to mesh with the ratchet 5 is performed by an adapted movement, according to a reverse displacement, so as to allow only the rotary movement of the ratchet 5 according to one or more teeth of its toothing 50.

For this purpose, said stop pawl 1 comprises means 8 for returning said pawl 1 during its angular displacement, from the inactive position to the active position.

Advantageously, said return means 8 and said body 3 are made in one piece. It is therefore the pawl 1 which integrates this return means 8, dispensing with an external and independent part. The return means 8 is therefore incorporated.

As mentioned above, such a configuration of the pawl 1 incorporating the return means 8 allows to reduce its space requirement, with a simplified manufacture of such a timepiece.

According to a preferred embodiment, said return means 8 comprises at least one blade 90 with one end 91 integral with said body 3 and a free opposite end 92. Such a blade 90 extends substantially along the circumference of the body 3. The blade 90 extends equidistantly or substantially equidistantly from the periphery of said body 3, or else by widening out from the end 91 towards the opposite end 92. The blade 90 therefore forms a continuation of the body 3 from its end 91. Furthermore, the space between the inner face of said blade 90 and the rest of the body 3 forms a groove 10. This groove 10 is closed at the end 91 of junction of the blade 90 with said body 3.

Such a blade 90 is provided elastic, that is to say it has a reversible deformation around a position of inertia. In short, the blade 90 returns to its shape and its original position if it is stressed. This resilience of the blade 90 gives elasticity to the return means 9 and its spring effect.

The blade 90 has a rounded or arched shape. This curved shape improves the flexibility and the elastic nature of said blade 90. As such, the elastic character of said blade 90 essentially provided by the material constituting the body 3 of the pawl 1, of which the blade 90 forms an integral part.

According to one embodiment, said body is made of a metallic material. Preferably, said body of the pawl 1 is made of a nickel-phosphorus alloy (NI-P).

The pawl 1 can be obtained by any type of method. Preferably, the body is manufactured by a LIGA-type method (for "Röntgenlithographie, Galvanoformung, Abformung", namely "X-ray lithography, electroforming, impression", this name taking up the major successive steps of such a method).

In particular, the cantilever between the end 91 of junction with the body 3 and the opposite end 92, as well as the material constituting the body 3 and said blade 90, ensure an elastic return of the blade 90 to its position of inertia, when said blade 90 is compressed and pushed towards the body 3, but also when the blade 90 is possibly pulled outwardly. In particular, under stress, the blade 90 is subjected to a bending stress essentially along a first portion located from its end 91 of junction with the body 3. The opposite end 92, in turn, displaces along an arc from the position of inertia moving closer to said body 3. Said position of inertia is in particular visible in FIGS. 1 to 2.

According to one embodiment, said body 3 comprises, protruding at the periphery and located facing the opposite end 92 of said blade 90, a hooking means 11 in abutment with said opposite end 92. Such a hooking means 11 may be in the shape of a recess, oriented towards said opposite end 92 and covering it on the outside. The hooking means 11 allows in particular to prevent traction of the blade externally relative to the body 3, ensuring its locking to prevent outward deformation, allowing only a flexibility of the blade 90 oriented towards the body 3. Such a hooking means 11 is in particular visible in FIGS. 3 and 4.

Preferably, the blade 90 can be stressed when it is positioned in locking of its opposite end 92 by the hooking means 11. In short, the blade 90 is already partially compressed.

Furthermore, said hooking means 11 closes the groove 10, preventing the clustering of several pawls 1 when these parts are packed in bulk.

As mentioned above, the groove 10 which extends between an inner face of said blade 90 and said body 3 from the end 91 integral with said body 3 and to the free opposite end 92 of said blade 90. In addition, the free opposite end 92 of said blade 90 comprises an overhang 12 protruding on the inner face. Such an overhang 12 therefore is in the shape of a boss. The overhang 12 has a thickness at least equal to the width of the groove 10. Consequently, said groove 10 comprises, facing the overhang 12, a notch 13 for receiving said overhang 12. Such a notch 13 forms a hollow in the body 3, in the shape of a cavity formed within the wall of the groove 10. The notch 13 is dimensioned, in particular in depth, to ensure the introduction of at least the distal portion of the overhang 12 during a stress applied to said blade 90. Such an overhang 12 and its notch 13 are in particular visible in FIGS. 1 and 2.

Like the hooking means 11, such a design of the pawl 1 equipped with such a notch receiving at least a portion of the overhang, allows the end of the groove 10 to be closed, preventing the clustering of several pawls 1 when these parts are packed in bulk.

Figure 6:
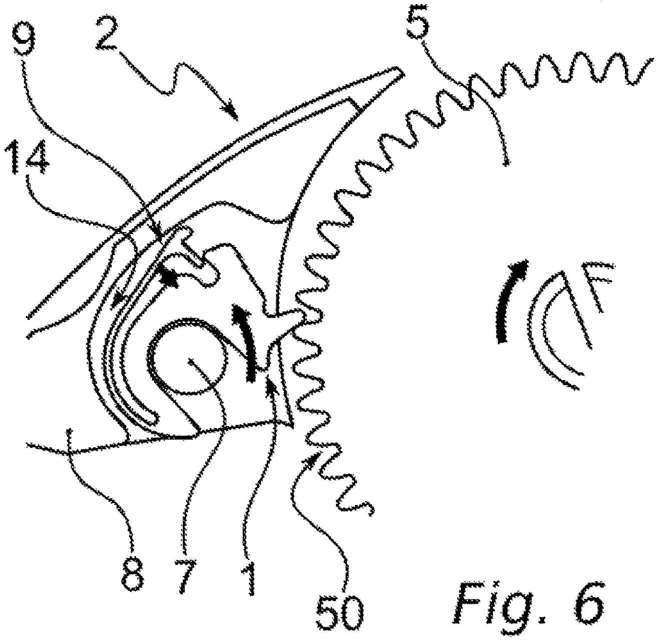
FIG. 6 schematically shows a view similar to FIG. 5, at the end of a first range of free rotational displacement of said pawl and at the start of a second range of compression of the return means against an inner wall of the housing of the blank.
Figure 7:
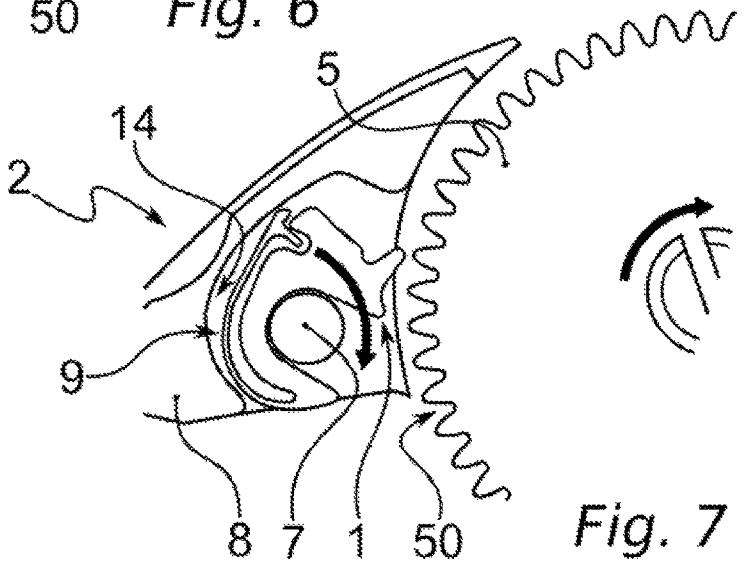
FIG. 7 schematically shows a view similar to FIG. 6, at the end of the second displacement range, in an inactive position of said pawl and at the end of compression of the return means against the inner wall.
Figure 8:
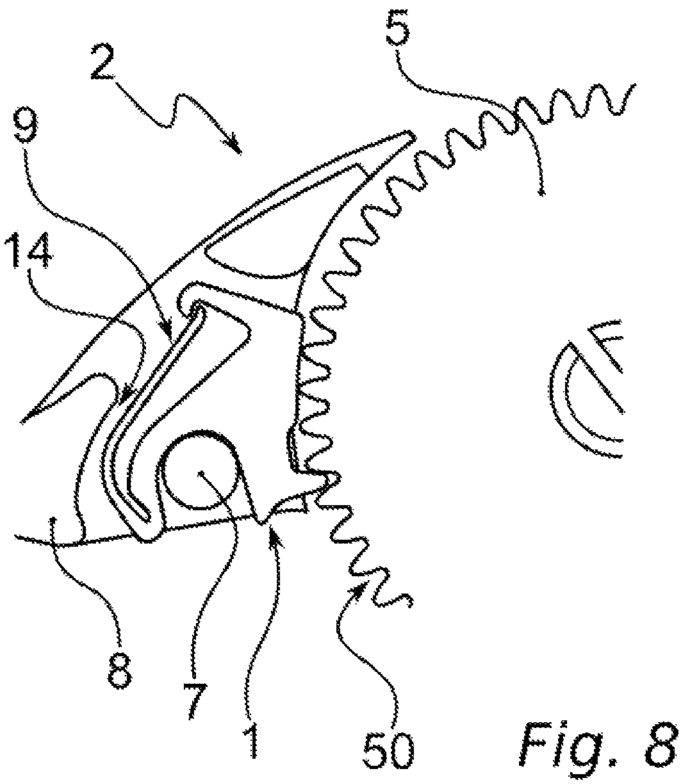
FIG. 8 schematically shows an elevational view of a second configuration of a horological movement, equipped with the second embodiment of the pawl, in an active position meshing with the toothing of a ratchet, showing in particular an open housing.

From the above, the body 3 of the pawl 1 incorporating the return means 9 in the shape of a blade 90, allows to apply an elastic return force, when a stress is applied along the distal portion of said blade 90. Such a return force allows to oppose the rotation of the hub 6 in one direction, when the body 3 is fixed around the rod 7, then returning the lug 4 in the opposite direction. An example of the forces applied can be seen in particular in FIGS. 6 and 7, showing a pawl 1 cooperating with a ratchet 5 within a horological movement 2.

In this regard, the invention also relates to such a horological movement 2.

Said horological movement 2 comprises a supporting structure in the shape of a blank 8. Such a blank 8 is used as a support for various timepieces. The blank 8 is intended to be fixed to the exterior of a timepiece, such as the watch case. The blank 8 can be in the shape of a plate. According to a preferred embodiment, the blank 8 can be the barrel bridge, or else a part integral with the barrel bridge.

The horological movement 2 also comprises a ratchet 5. This ratchet 5 is provided with a toothing 50. The ratchet 5 is mounted on said blank 8 in a rotary movement. In particular, such a rotary movement is induced by the barrel through an adapted connection.

The horological movement 2 also comprises a mechanism for latching with the toothing 50 of said ratchet 5. Such a latching mechanism allows to control the transmission of the rotary movement of said ratchet 5. In particular, the latch ensures a transformation from, at the input a continuous rotary movement induced by the ratchet 5, to, at the output, an oscillating reciprocating movement of said ratchet 5.

For this purpose, said latching mechanism is rotatably mounted inside a housing 14 formed within said blank 8. Such a housing 14 is dimensioned to allow the latching mechanism to be introduced therein and retained therein in order to cooperate with the toothing of the ratchet 5.

As such, the horological movement 2 comprises a rod 7 for free rotation of said latching mechanism within the housing 14 of said blank 8. The rod 7 is then dimensioned to complement the hub 6 of the pawl 1. Furthermore, the rod 7 fixedly cooperates with a bore 15 formed within said housing 14.

Advantageously, said latching mechanism comprises a stop pawl 1 as described above. The latching mechanism can comprise other timepieces, but preferably it only comprises the pawl 1.

As mentioned above, the pawl 1 is then positioned in the housing 14, while orienting the lug 4 towards the toothing 50 of the ratchet 5, while the blade 90 is located on the side opposite to said toothing 50. Consequently, the housing 14 is open on the side intended for the pawl 1 to cooperate with the ratchet 5. Such a positioning is in particular visible in FIGS. 5 to 8.

Further on, the horological movement 2 allows the compression of the blade 90 of the pawl 1, during its rotation induced by the rotary movement of said ratchet 5. This compression can be performed by any type of means, in particular by an abutment.

According to one embodiment, said housing 14 comprises an inner wall 140 cooperating with an outer face of the blade 90 of said pawl 1. Thus, the housing 14 is hollowed out with a flat upper face 141 and recessed in the thickness of the blank 8. Consequently, the inner wall 140 extends orthogonally or substantially orthogonally from said upper wall 141 to the surface 80 of the blank 8.

According to one embodiment, the inner wall 140 can be continuous. In short, the inner wall 140 extends without intermittence or without opening from one end of the housing 14 to the other. The inner wall 140 then ensures the compression of the blade 90 at its free end 92 during the rotation of the pawl 1. Such a configuration can be seen in particular in FIGS. 5 to 7.

According to another embodiment, said inner wall 140 of said housing 14 is discontinuous along a portion of its length located facing said blade 90. In short, the housing 14 has an opening passing through its inner wall 140, on the side of the blade 90 of the pawl 1. This discontinuity of the inner wall 140 allows to considerably lighten the blank 8. The discontinuity also allows to control the displacement of the pawl 1, in particular by dimensioning the length of the lower portion of the inner wall 140, the upper angle of which is used as an abutment for compressing the blade 90 when rotating the pawl 1. Such a configuration can be seen in particular in FIG. 8.

As mentioned above, the rod 7 allows to position and hold the pawl 1 in the housing 14, allowing its free rotation. For this purpose, the rod 7 cooperates in the lower portion with the bore 15. In the upper portion, the rod 7 comprises a head 70, ensuring the upper retention of the pawl 1 along said rod 7.

Furthermore, the rod 7 has an external diameter equivalent or substantially equivalent to the internal diameter of said hub 6, except for a clearance allowing the insertion of one relative to the other during mounting, and conversely during dismounting, the contact between the circumference of the rod 7 and the hub 6 is either direct or indirect via a rotating annular ring.

According to one embodiment, said bore 15 is tapped and the rod 7 is then in the shape of a screw. The tapping of the bore 15 is then carried out complementarily to the screw thread of the rod 7. The assembly of the rod 7 in the shape of a screw with the tapped bore 15 ensures a removable fixing, easily allowing the mounting and the dismounting of the pawl 1, by screwing and unscrewing said rod 7, before or after mounting or dismounting the ratchet 5.

Figure 9:
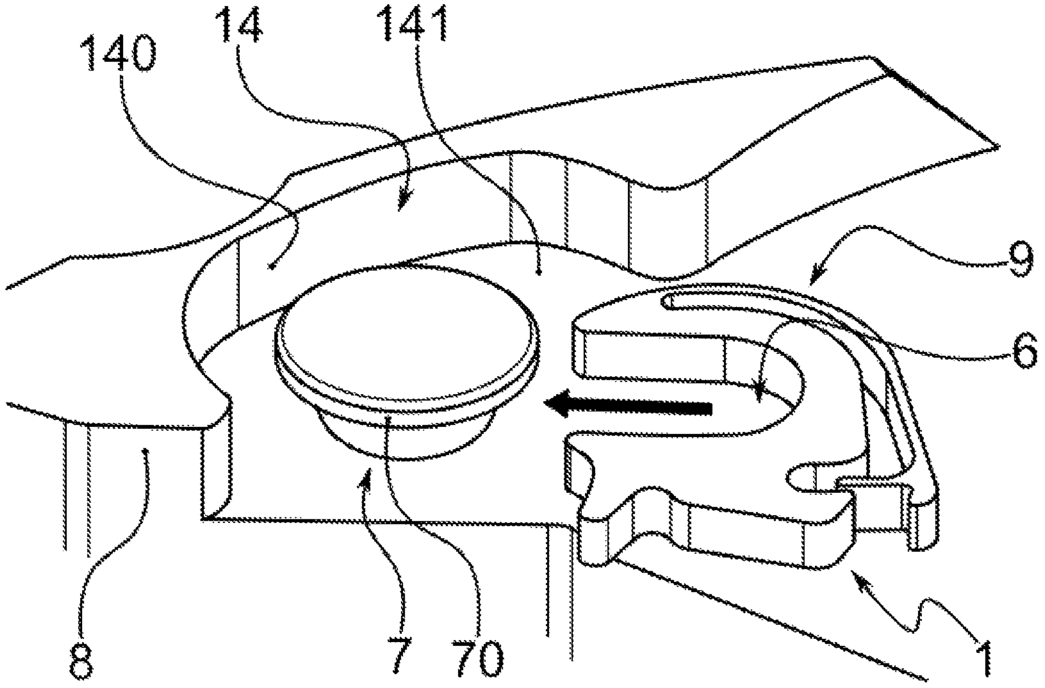
FIG. 9 schematically shows a perspective view of an example of the pawl mounting step according to the second variant of the first embodiment.
Figure 10:
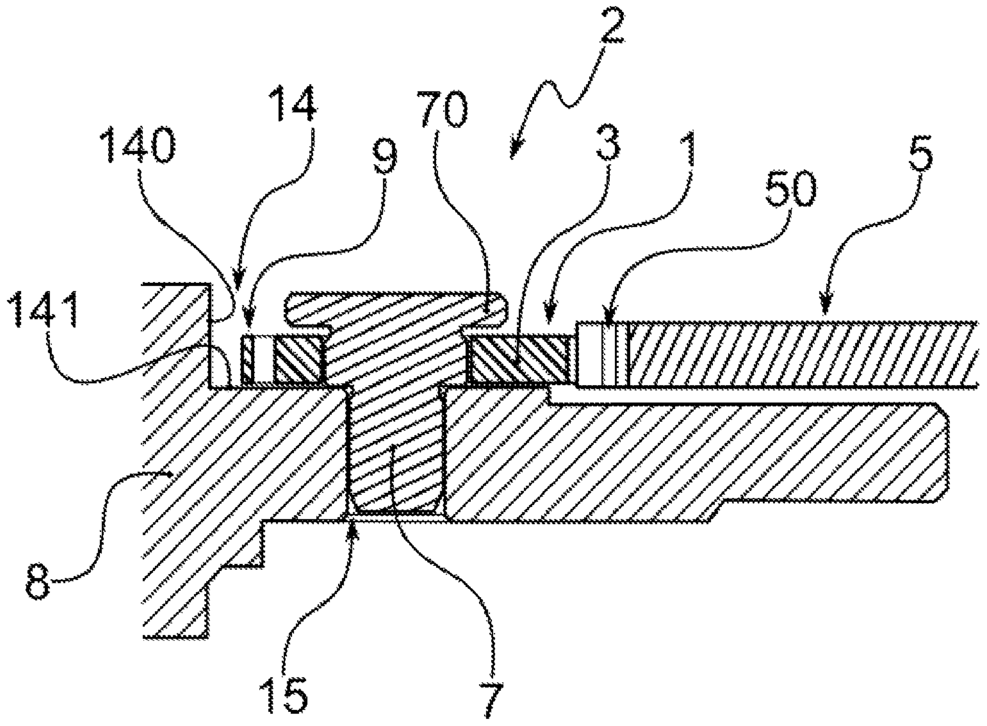
FIG. 10 schematically shows a view in vertical section of a configuration of a horological movement equipped with the first embodiment of the pawl, showing in particular the rod for fixing said pawl with the blank.

Furthermore, such a screw connection is adapted for a pawl 1 provided with a closed or open hub 6. In the case of an open hub 6 providing a U-shape to said pawl 1, the assembly can be carried out once the rod 7 is screwed, by sliding said pawl 1. This mounting involves placing the pawl 1 first, to rotate it to the desired angular position and only then to place the ratchet 5. Such a mounting operation is visible in particular in FIG. 9. Conversely, during dismounting, it is possible to remove the pawl 1 by unscrewing the rod 7 or preferably without unscrewing it. In the latter case, the dismounting involves extracting the ratchet 5 first, then ensuring the prior emptying of the barrel.

According to another embodiment, the rod 7 is in the shape of a nail driven into said bore 15. The assembly of the rod 7 in the shape of a nail driven into the bore 15 is final, namely once the nail has been introduced, it can only be removed with difficulty, without risking damage to the other timepieces.

Consequently, in order to allow dismounting the pawl 1, its hub 6 is necessarily open, giving said pawl 1 its specific horseshoe shape. Consequently, the first mounting consisting in introducing the rod 7 into the bore 15 can be carried out after positioning the pawl 1, the introduction of the rod 7 being performed by passing through its hub 6. Preferably, for any mounting, once the rod 7 has been introduced into the bore 15, the pawl 1 is mounted by sliding. This mounting involves placing the pawl 1 first, rotating it to the desired angular position and only then placing the ratchet 5. Such a mounting operation is in particular visible in FIG. 9. Conversely, during mounting, it is possible to remove the pawl 1 only by having removed the ratchet 5 first, then ensuring the prior emptying of the barrel. Furthermore, a rod 7 in the shape of a driven nail dispenses with the step of precisely producing the tapping of the bore 15, as well as the wear over time occurring during mounting and dismounting. This solution allows to considerably simplify mounting and dismounting, while limiting the risks of deterioration of the timepieces.

Further on, the configuration according to the invention of a pawl 1 incorporating the return means 9 in the shape of the blade 90, allows to facilitate the mounting and dismounting of said pawl 1 within the horological movement 2. Indeed, this configuration allows to limit the return action to a range of the angular displacement of the pawl 1.

According to a first range, the pawl 1 is rotationally free and although the lug 4 is meshing with the toothing 50 of the ratchet, said lug 4 does not apply any force to the ratchet 5. Furthermore, along said first range, the friction between the lug 4 and the toothing 50 is almost non-existent, reducing wear over time. This first range corresponds to the angular travel of the pawl 1 from an active position meshing the lug 4 with the toothing 50, until starting to stress the blade 90. The extent of said first range is in particular visible in FIGS. 5 and 6 between two angular positions of said pawl 1.

It is only over a second range of the angular displacement of the pawl 1 that the return is activated when the blade 90 begins to be compressed until the lug 4 reaches the inactive position and loses meshing with the toothing 50. At this moment, the compression of the blade 90 returns the pawl 1 in the opposite direction to its initial position. The extent of said second range is visible in particular in FIGS. 6 and 7 between two angular positions of said pawl 1.

Thus, along this displacement including these two first and second ranges, the friction between the pawl 4 and the ratchet 5 is therefore drastically reduced.

Furthermore, depending on the shape of the housing 14 in the blank 8, as well as the dimensioning of the opening of the discontinuous inner wall 140, it is possible to vary the ranges of the angular displacement of said pawl 1, in order to control the action of its return to bring the pawl 1 back to the locking position of said ratchet 5 as soon as possible. This early return allows in particular to limit the emptying of the barrel during an automatic winding.

Furthermore, the fact that a first range of its displacement ensures complete freedom of movement for the pawl 1, especially during mounting, the angular positioning of the ratchet 5 relative to the lug 4 is considerably simplified.

The invention also relates to a timepiece comprising the horological movement 2 as described above. Such a timepiece can preferably be a watch.

The invention claimed is:

1. A stop pawl for a horological movement, comprising:

a body provided with a lug for latching with the toothing of a ratchet, and a hub configured to cooperate freely in rotation with a fixed rod according to an angular displacement between an active position meshing said lug with the toothing of said ratchet and an inactive position, via intermediate positions; and one means for returning said stop pawl during its angular displacement, from the inactive position to the active position, wherein:

said return means and said body are made in one piece, said return means comprises at least one elastic blade with one end integral with said body and a free opposite end, the body includes a groove extending between an inner face of said elastic blade and said body from the end integral with said body and to the free end of said elastic blade, the free end of said elastic blade includes an overhang protruding on the inner face, said groove includes, facing the overhang, a notch for receiving said overhang, the lug is located on an outer peripheral surface of the body at a position spaced apart from the at least one elastic blade.

2. The stop pawl according to claim 1, wherein said body comprises:

protruding at the periphery of said body and located facing the opposite end, a hooking means in abutment with said opposite end.

3. The stop pawl according to claim 1, wherein:

said hub is closed and is in the shape of a circular bore.

4. The stop pawl according to claim 1, wherein:

said hub is open, said body having an overall U-shape.

5. The stop pawl according to claim 1, wherein:

said body is made of a metallic material.

6. The stop pawl according to claim 1, wherein:

said body is made of a nickel-phosphorus alloy.

7. The stop pawl according to claim 1, wherein:

said body is manufactured by a LIGA-type method.

8. A horological movement, comprising:

a supporting structure in the shape of a blank;

a ratchet mounted on said blank in a rotary movement, said ratchet being provided with toothing;

a mechanism for latching with the toothing of said ratchet, said latching mechanism being rotatably mounted inside a housing formed within said blank;

a rod for free rotation of said latching mechanism within the housing of said blank, said rod fixedly cooperating with a bore formed within the housing of said blank;

wherein:

said latching mechanism comprises the stop pawl according to claim 1.

9. The horological movement according to claim 8, wherein:

in the upper portion, the rod comprises a head, ensuring the upper retention of the pawl along said rod.

10. The horological movement according to claim 8, wherein:

said bore is tapped;

said rod is in the shape of a screw.

11. The horological movement according to claim 8, wherein:

said rod is in the shape of a nail driven into said bore.

12. The horological movement according to claim 8, wherein:

said housing comprises an inner wall cooperating with an outer face of the elastic blade of said pawl.

13. A timepiece comprising a horological movement according to claim 8.

* * * * *